Jan. 18, 1927.
J. C. NELSON ET AL
1,614,894
CASTER MOUNTING
Filed May 22, 1925
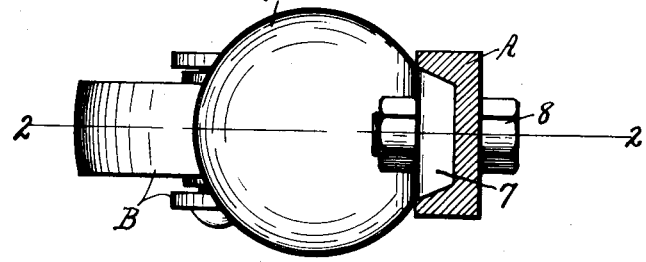
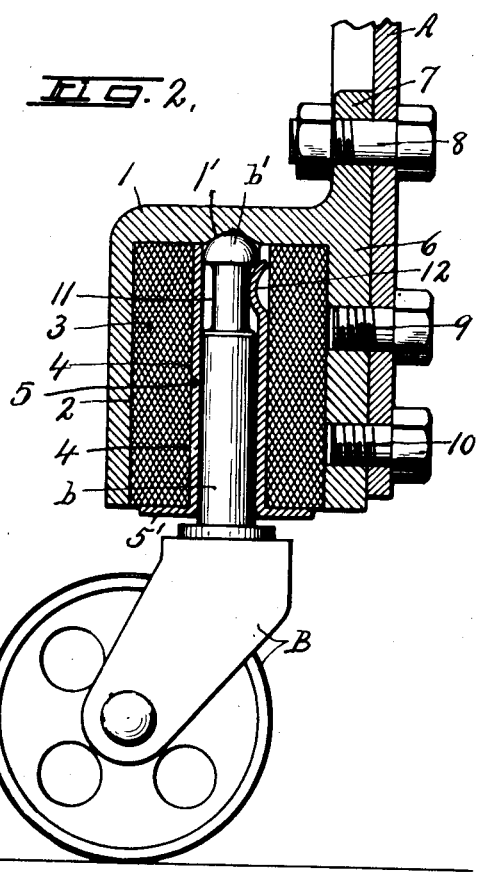
WITNESS
H. V. Hurst
INVENTORS
Jabez C. Nelson
Peter E. Geldhof
BY Denison & Thompson
ATTORNEYS Patented Jan. 18, 1927.

1,614,894

UNITED STATES PATENT OFFICE.

JABEZ C. NELSON AND PETER E. GELDHOF, OF SYRACUSE, NEW YORK, ASSIGNORS TO SYRACUSE WASHING MACHINE CORPORATION, OF SYRACUSE, NEW YORK, A CORPORATION OF NEW YORK.

CASTER MOUNTING.

Application filed May 22, 1925. Serial No. 32,204.

This invention relates to caster mountings for various objects which are adapted to be moved across a floor or other support and is particularly useful in connection with clothes washing machines and centrifugal driers or a combined washer and drier as set forth in our pending application Serial #28,564, filed May 7, 1925, although it is equally applicable to mechanical dish washers and analogous machines having more or less vibration due to the action of movable parts mounted upon the supporting frame of the machine.

In machines of this character the vibration incidental to the operation of the moving parts is transmitted to the main supporting frame and thence thru the legs to the casters resulting in more or less irregular motion of the casters along and upon the floor and aside from the inconvenience arising from the shifting of the position of the machine this movement is accompanied with more or less objectionable noise and the main object of our present invention is to cushion the caster in its mounting in such manner as to reduce the shifting movement of the machine to a minimum and also to eliminate the noise incidental to such shifting movement.

Another object is to provide simple and efficient means for retaining the caster in its mounting against displacement when the machine is tilted or lifted from the floor.

Other objects and uses will be brought out in the following description.

In the drawings:

Figure 1 is a top plan of the caster and its mounting showing in section the legs of a combined clothes washing and centrifugal drying machine as illustrated in our pending application referred to.

Figure 2 is a vertical sectional view taken in the plane of line 2—2, Figure 1.

As illustrated this mounting comprises a bracket —1— having a socket —2— closed at the top and open at the bottom for receiving and retaining a resilient bushing or sleeve —3— of soft rubber or equivalent material, the latter being provided with a central opening —4— for receiving a tubular bearing member —5— of sheet metal or equivalent material.

The main body of the bracket —1— is substantially cylindrical except that one side as —6— is flattened and provided with an upward extension —7— for receiving bolts —8—, —9— and —10— by which the bracket is firmly secured in the channel of a channel-iron leg —A—, commonly used on clothes washing machines and analogous apparatus.

The caster as —B— is provided with a cylindrical shank —b— journaled in the tubular bearing —5— and having its upper end —b'— rounded and seated against a concave end thrust bearing —1'— in the lower face of the top wall of the bracket —1— for limiting the upward movement of the shank in the bearing.

The tubular bearing —5— extends the entire length of the socket —2— so that its upper end may engage the underside of the top wall of the bracket —1—, the lower end of said tubular bearing being provided with an outwardly projecting annular flange —5'— of less diameter than the socket —2— so as to engage the lower end face of the cushion sleeve or bushing —3—.

The socket —2— and rubber cushion bushing —3— are preferably cylindrical, the rubber bushing being normally of slightly greater diameter than the socket —2— so that when inserted in the socket under slight compression it will automatically expand against the side walls of the socket and thereby retain itself in place by friction with said walls.

The central opening as —4— in the bushing —3— and tubular bearing —5— are also cylindrical, the opening —4— being normally of slightly less diameter than the external diameter of the tubular bearing —5— so that when the latter is inserted into the opening —4— it will slightly compress the bushing —3— in the socket —2— and will thereby be held in place by friction with the bushing.

It is evident, however, that if necessary the bushing may be cemented or otherwise secured in the socket —2— and that the tubular bearing —5— may also be cemented or otherwise secured in the central opening —4— of the bushing to more effectively hold the parts in place against downward displacement.

The upper portion of the shank —b— just below the head —b'— is reduced in diameter to form an annular groove —11— for receiving a spring tongue —12— on the adjacent portion of the tubular bearing —5—, said tongue being concavo-convex longitudinally with its convex side facing the reduced portion of the shank —b— and is adapted to enter the groove —11— for holding the caster against downward displacement from its bearing —5— when the machine is tilted or lifted from the floor.

The shank —b— is slightly longer than the tubular bearing —5— so that when the rounded head —b'— is engaged with the end-thrust bearing —1'— the portion of the caster at the lower end of the shank —b— will be held in slightly spaced relation to the adjacent lower end of the sleeve of the tubular bearing or its annular flange —5'— thereby throwing the entire load of the machine upon the upper rounded end of the caster and permitting the shank —b— with the caster thereon to turn freely in the tubular bearing without liability of friction between the sleeve and adjacent underlying portion of said caster.

The upper clamping bolt is passed thru registering apertures in the leg —A— and extension —7— while the remaining bolts —9— and —10— are inserted in suitable openings in the adjacent portions of the leg —A— and engage in threaded apertures in the adjacent side of the bracket —1— to firmly hold the bracket in fixed relation to the leg.

Operation.

When the casters —B— are resting upon the floor and the legs A are supporting a washing or drying machine or a combined washing and centrifugal drier having rotating, reciprocating and other movable parts traveling at variable speeds more or less vibration incidental to the movement of those parts is transmitted to the legs —A— and to the brackets —6— and such vibrations are wholly or partially absorbed by the rubber cushion —3— thus permitting or at least reducing the transmission of the vibrations to the casters —B— and consequently reducing the shifting movement and noise incidental to such shifting movement to a minimum and at the same time avoiding excessive strains upon the shanks of the casters as would be the case if said shanks were rigidly secured to the brackets —1—.

What we claim is:

1. A caster mounting comprising a bracket having an upright socket closed at the top and provided with an end thrust bearing on the underside of the top, a caster having the upper end of its shank seated against the end-thrust bearing, a tubular journal bearing for the shank, and a resilient cushion between the tubular journal bearing and walls of the socket.

2. A caster mounting comprising a bracket having a socket open at the bottom and having a bearing at the top, a resilient bushing fitted within the socket and having its upper end abutting against the top bearing of the bracket, said bushing having a central lengthwise opening therethrough from end to end, a tube fitted in said opening and having its lower end provided with an outturned flange seated against the lower end of the resilient bushing, and a caster having a shank extending through the tube and above the upper end of said tube and bushing and engaged with the bearing at the top of the bracket.

3. In a caster for the purpose described, a bracket having a cylindrical socket open at the bottom and closed at the top, the closed top wall of the socket being provided with an end-thrust bearing in its underside for receiving the upper end of the shank of the caster, a soft rubber bushing seated in the socket and provided with a central opening therethrough, and a tubular metal journal bearing extending thru the central opening in the bushing for receiving the shank of the caster.

In witness whereof we have hereunto set our hands this 15th day of May, 1925.

JABEZ C. NELSON.
PETER E. GELDHOF.